(12) United States Patent
Gagne-Keats et al.

(10) Patent No.: US 11,899,603 B1
(45) Date of Patent: Feb. 13, 2024

(54) CONNECTION HUB WITH INTEGRATED SWITCH FOR PRIVATE AND NON-PRIVATE MODES

(71) Applicant: Osom Products, Inc., Cupertino, CA (US)

(72) Inventors: Jason Sean Gagne-Keats, Cupertino, CA (US); David John Evans, V, Portola Valley, CA (US); James Kim, San Jose, CA (US); Evan Jackson, San Jose, CA (US); Nicholas Franco, San Jose, CA (US); Edith Silver Walker, San Francisco, CA (US)

(73) Assignee: OSOM PRODUCTS, INC., Cupertino, CA (US)

( * ) Notice: Subject to any disclaimer, the term of this patent is extended or adjusted under 35 U.S.C. 154(b) by 0 days.

(21) Appl. No.: 18/338,201

(22) Filed: Jun. 20, 2023

Related U.S. Application Data

(63) Continuation-in-part of application No. 17/549,488, filed on Dec. 13, 2021, now abandoned.

(51) Int. Cl.
*G06F 13/38* (2006.01)
*G06F 13/40* (2006.01)

(52) U.S. Cl.
CPC ........ *G06F 13/385* (2013.01); *G06F 13/4022* (2013.01); *G06F 2213/0042* (2013.01)

(58) Field of Classification Search
CPC ............... G06F 13/385; G06F 13/4022; G06F 2213/0042
See application file for complete search history.

(56) References Cited

U.S. PATENT DOCUMENTS

| | | |
|---|---|---|
| 8,862,921 B1 | 10/2014 | Kim et al. |
| 2009/0294150 A1 | 12/2009 | McGinley et al. |
| 2015/0126070 A1 | 5/2015 | Candelore |
| 2020/0341922 A1 | 10/2020 | Nakata et al. |
| 2021/0234384 A1 | 7/2021 | Kealy et al. |

FOREIGN PATENT DOCUMENTS

| | | | | |
|---|---|---|---|---|
| CN | 107451082 A | * | 12/2017 | ......... G06F 13/4004 |
| GB | 2565849 A | | 2/2019 | |

OTHER PUBLICATIONS

Amazon web page for Atolla 4 port USB hub—Mar. 1, 2021—https://www.amazon.com/gp/product/B00W9FLKTY/ref%3Dppx_yo_dt_b_asin_title_o03_s00?ie=UTF8&psc=1 (Year: 2021).*

* cited by examiner

*Primary Examiner* — Idriss N Alrobaye
*Assistant Examiner* — Ronald T Modo
(74) *Attorney, Agent, or Firm* — Perkins Coie LLP; Alberto Araiza

(57) ABSTRACT

A connection hub includes a housing coupled to a universal serial bus (USB) cable that includes a plug for electronic devices. A housing of the connection hub includes a number (N) of ports and switches. The connection hub includes 1-to-N connections between the USB cable and the N ports, where each of the N ports includes a data line and/or a power line. The switches each include a mechanical component that is movable between a first position that activates a private mode and a second position that deactivates the private mode. A data line of a particular port is disabled when the private mode is activated, and a particular power line of the particular port is enabled when either the private mode is activated and when the private mode is deactivated.

29 Claims, 8 Drawing Sheets

CONNECTION HUB WITH INTEGRATED SWITCH FOR PRIVATE AND NON-PRIVATE MODES

CROSS-REFERENCE TO RELATED APPLICATIONS

This application is a continuation in part of U.S. patent application Ser. No. 17/549,488 filed Dec. 13, 2021, incorporated herein by reference in its entirety.

BACKGROUND

Universal Serial Bus (USB) is an industry standard that establishes specifications for cables, connectors, and protocols for connection, communication, and power supply between computers, peripherals, and other computers. Specifically, USB was designed to standardize the connection of peripherals to personal computers, both to communicate with and to supply electric power. USB has largely replaced interfaces such as serial ports and parallel ports and has become commonplace in a wide range of devices. Examples of devices that connect via USB include cameras, printers, media players, mobile phones, and network adapters. USB connectors have been increasingly replacing other types of charging ports for portable devices. In fact, a broad variety of USB hardware exists, including fourteen different connectors, of which USB-C is most recent.

USB was developed to simplify and improve the interface between personal computers and peripheral devices, when compared with previously existing standard or ad hoc proprietary interfaces. From the computer user's perspective, the USB interface improves ease of use in several ways. For example, the USB interface is self-configuring, eliminating the need for the user to adjust the device's settings for speed or data format, or configure interrupts, input/output addresses, or direct memory access channels. USB connectors are standardized at the host, so any peripheral can use most available connectors. Further, USB takes full advantage of the additional processing power that can be economically put into peripheral devices so that they can manage themselves. As such, USB devices often do not have user-adjustable interface settings. The USB interface is hot-swappable (e.g., devices can be exchanged without rebooting the host computer). In addition, small electronic devices (e.g., mobile phones) can be powered directly from the USB interface, eliminating the need for additional power supply cables.

BRIEF DESCRIPTION OF THE DRAWINGS

Detailed descriptions of implementations of the present invention will be described and explained through the use of the accompanying drawings.

Figure 1:
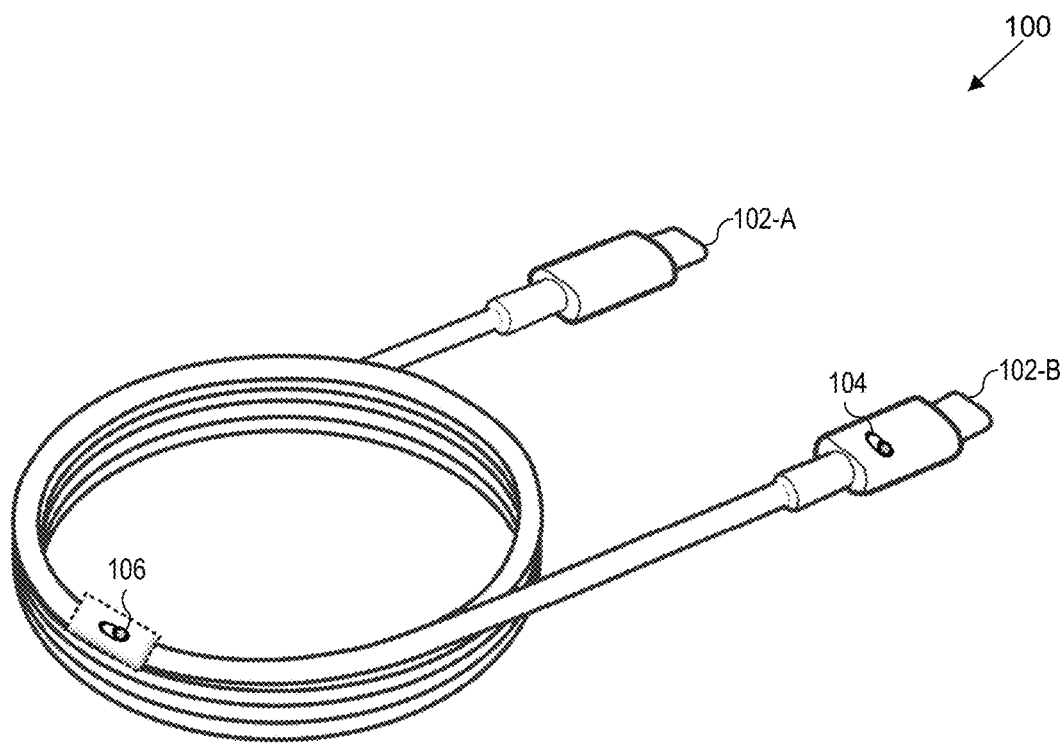
FIG. 1 illustrates a Universal Serial Bus (USB) cable that implements aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

An aspect of the disclosed technology relates to incorporating a switch into a Universal Serial Bus (USB) cable. The USB cable can connect two electronic devices both to communicate data and to supply electric power. Examples of electronic devices include a personal computer connected to a peripheral device such as a computer keyboard, mouse, camera, printer, portable media player, mobile phone, and network adapter. The switch integrated into the USB cable can be toggled between at least two states to activate or deactivate modes that enable or disable selected functions. For example, mechanically actuating the switch can set the USB cable to a private mode that disables data communication between the electronic devices.

Another aspect of the disclosed technology relates to a multiport hub that has one or more privacy switches. The privacy switches are line-level and designed for users to selectively control data and/or power flows through connection elements (e.g., ports) of the multiport hub. The multiport hub can connect two or more electronic devices to communicate data/or to supply electric power through different types of ports. For example, one connection element can include a USB-C cable that connects to an electronic device through another connection element of the multiport hub. Examples of electronic devices include a personal computer connected to a peripheral device through the multiport hub.

The privacy switches are integrated in the multiport hub and are switchable between at least two states to activate or deactivate different modes that enable or disable functions (e.g., data transfer, power transfer). For example, mechanically actuating a privacy switch can set the entire multiport hub to a private mode that disables all data communication through the multiport hub while allowing power to charge devices connected through any port of the multiport hub. In another example, each of multiple ports has its own switch so that a user can decide specifically which port to set in private mode and which to set in non-private mode. In yet another example, a switch is switchable between at least three states including a mode that disables all functions to one or more ports of the multiport hub. Hence, the multiport hub can integrate a combination of different types of switches that provide for two modes or three modes (e.g., an additional "off" mode) to provide functionality that both allows for exchanging data between two devices connected to the multiport hub and, for example, receiving power from an external source while preventing data from flowing to or from the external source.

The multiport hub can provide 1-to-N connections for one or more ports where, for example, a USB-C connection is coupled to different types of ports through the multiport hub. The multiport hub supports different types of ports that can be categorized as: (i) data-only ports and (ii) power and data ports. The privacy switches allow a user to manage data communications through ports of both categories and additionally manage power for ports of the power and data category. Examples of data-only connections include Ethernet, 3.5 mm jack (e.g., mono, stereo, stereo and microphone), and card or storage media (e.g., SD, MicroSD, CF). Examples of power and data ports include USB (e.g., A, Mini, Micro, C), Thunderbolt, and Displays (e.g., HDMI, Display Port, mini-DisplayPort, DP++, mini DVI).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

FIG. 1 illustrates a USB cable that can implement aspects of the present technology. As shown, the USB cable 100 ("cable 100") includes two connectors 102-A and 102-B (also referred to as "plugs") that can plug into receptacles (also referred to as "sockets") of electronic devices to exchange data over one or more data lines and/or transfer power over one or more power lines. The cable 100 of the illustrated example is a standard USB-C cable that is usually included in-box with consumer devices but additionally includes a switch 104 that enables a user to physically disable/enable a function (e.g., data exchange) on demand, while maintaining another function (e.g., for rapid charging) operational. The switch 104 can be incorporated into a housing of any type of USB cable or other data cable that has additional functions (e.g., power charging).

As shown, the switch 104 is incorporated only into the connector 102-B and not connector 102-A or is optionally incorporated in another housing located elsewhere on the cable 100 (e.g., switch 106). In fact, a switch can be located anywhere that includes the data lines and/or power lines of the cable 100. In another example, a switch is incorporated into each connector at both ends of the cable 100 (not shown). The switch 104 is described herein without certain details of a typical design and operation of any internal circuitry of switches or USB cables or connections that are well known. In one example, the switch 104 gives users the ability to activate a private mode that interrupts data lines between the electronic devices coupled to the connectors 102-A and 102-B of the cable 100. Activating or deactivating the private mode does not necessarily impede other functions including a fast charge function or other power delivery functions.

Figure 2:
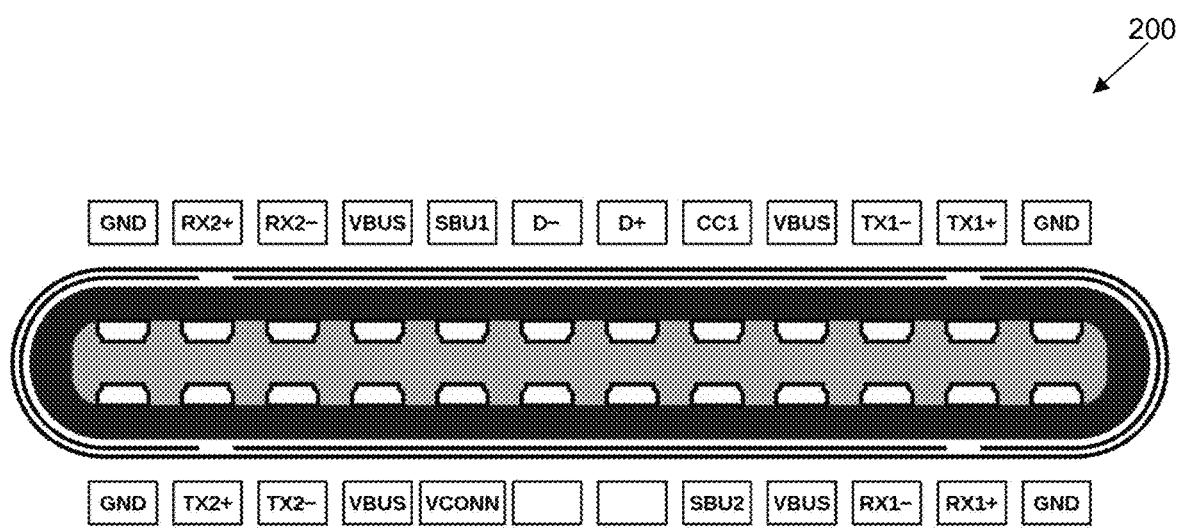
FIG. 2 illustrates a connector including a pin structure of a standard USB Type-C connector.

USB cables of different types (e.g., 2.x, 3.x, Type-C) can have different connectors that plug into different receptacles (e.g., different shapes and sizes). Moreover, different types of connectors can have different pin configurations. For example, FIG. 2 illustrates a standard USB Type-C connector with 24 pins. The pins include a set of D+ and D− pins for data communication of USB 2.0 connectivity. The $V_{BUS}$ and GND pins are power and the return paths for signals. The default $V_{BUS}$ voltage is 5 V but the USB standard allows devices to negotiate and choose a $V_{BUS}$ voltage other than the default value. The power delivery allows $V_{BUS}$ to have a voltage up to 20 V. The maximum current could be raised up to 5 A. Hence, USB Type-C could deliver a maximum power of 100 W. The high-power flow could be useful when charging a large device such as a notebook computer. The power delivery technology makes USB Type-C more versatile than older standards because the power level is adaptable with the needs of a load. As such, a user can charge both a smartphone and notebook using the same cable.

The connector 200 includes two sets of RX pairs and two sets of TX pairs. One RX pair along with one TX pair could be used for the USB 3.x protocol. A USB Type-C port could support USB 3.x standards but the minimum feature set of USB Type-C does not include USB 3.x. In such cases, the RX/TX pairs are not used by the USB 3.x. connectivity and could be used for other USB Type-C functionalities.

The male CC1 pin and a counterpart female CC2 pin (not shown) are channel configuration pins that perform a number of functions such as cable attachment and removal detection, connector/plug orientation detection, and current advertisement. These pins could also be used for the communications required by the power delivery and alternate mode. Some active cables utilize a re-driver chip to strengthen the signal and compensate for the losses incurred by the cable. In these cases, the circuitry can be powered inside the cable by applying a 5-V, 1-W power supply to the $V_{CONN}$ pin. The SBU1 and SBU2 pins correspond to low-speed signal paths that are used only in an alternate mode.

The data connection for the cable 100 is only required to meet USB 2.0 speeds, and thus the SuperSpeed lines for USB 3.x can be ignored for simplicity. Examples of active pin connections in private and non-private modes are illustrated below as tables where each cell represents a pin. The shaded cells represent pins that could operate the same under private and non-private modes or have functions that are irrelevant to those modes.

| Non-Private Mode (e.g., USB 2.0) | | | | | | | |
|---|---|---|---|---|---|---|---|
| GND | $V_{BUS}$ | | D− | D+ | CC | $V_{BUS}$ | GND |
| GND | $V_{BUS}$ | $V_{CONN}$ | | | | $V_{BUS}$ | GND |

| Private Mode (e.g., power only, data blocking mode) | | | | | |
|---|---|---|---|---|---|
| GND | $V_{BUS}$ | | CC | $V_{BUS}$ | GND |
| GND | $V_{BUS}$ | $V_{CONN}$ | | $V_{BUS}$ | GND |

As shown above, in non-private mode, the D+ and D− pins are enabled to provide USB 2.0 connectivity (e.g., uninterrupted data). On the other hand, in private mode, the D+ and D− pins are disabled (e.g., interrupted, blocked) to disallow USB 2.0 connectivity. The $V_{BUS}$ and GND pins remain functional regardless of whether the cable is in private or non-private modes.

Figure 3A:
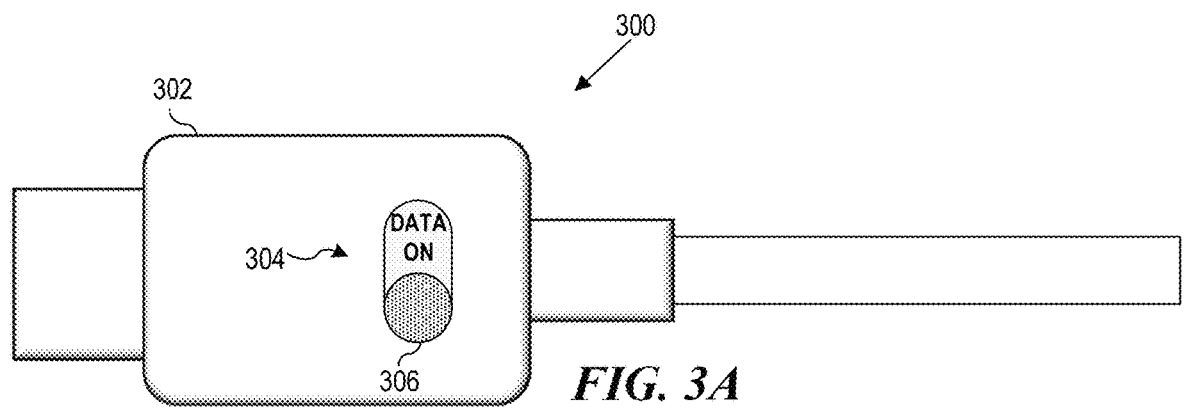
FIG. 3A illustrates a top view of a USB cable including a connector with a privacy switch positioned to enable data communications.
Figure 3B:
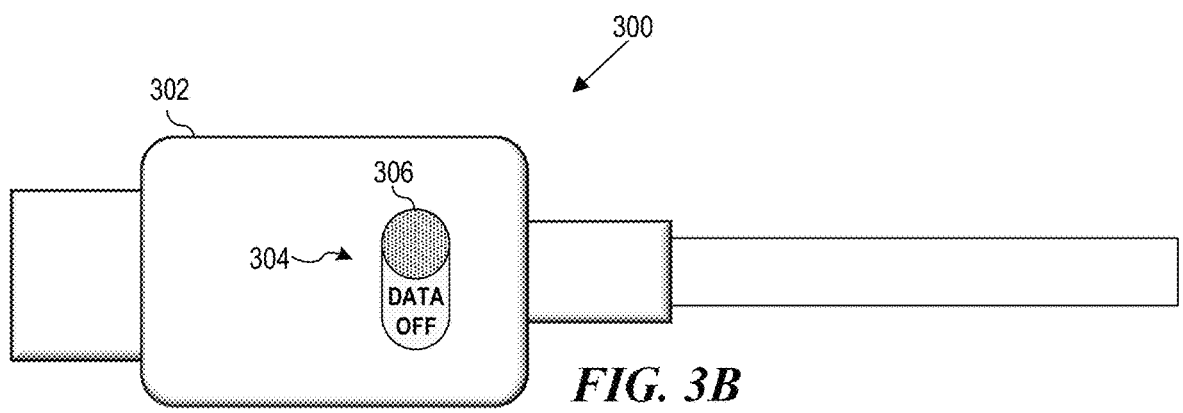
FIG. 3B illustrates a top view of the USB cable of FIG. 3A with the privacy switch positioned to disable data communications.
Figure 3C:
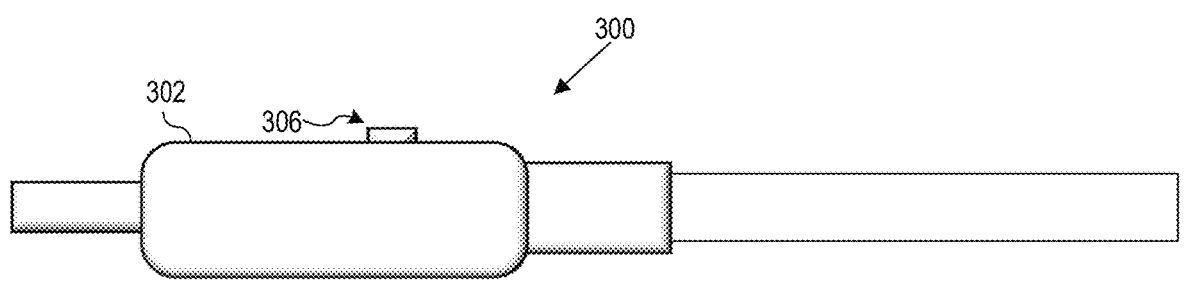
FIG. 3C illustrates a side view of the USB cable of FIG. 3A.

FIGS. 3A through 3C are illustrations of an end portion 300 of a USB cable that includes a connector 302 integrating a switch 304 having a toggle 306 that can be switched between two alternative positions to activate or deactivate different modes. Specifically, FIG. 3A illustrates a top view of the end portion 300 including the toggle 306 of the switch 304 in a first position that activates a non-private mode and deactivates a private mode. As such, the cable enables data transfers between two devices that are coupled via the cable. FIG. 3B illustrates a top view of the end portion 300 including toggle 306 of the switch 304 in a second position that activates the private mode and deactivates the non-private mode. As such, the USB cable disables data transfers between two devices that are coupled to respective ends of the USB cable. Lastly, FIG. 3C illustrates a side view of the end portion 300 including the toggle 306 protruding above the surface of the connector 302.

The connector 302 includes a housing having an outer surface configured for gripping by a user to manually insert or remove the connector to or from a receptacle of an electronic device. The connector 302 also includes data and power lines (not shown) inside the housing and coupled to respective pins that can electrically contact counterpart pins on the receptacle of the electronic device. For example, a power line inside the housing can transfer power to the electronic device and data lines inside the housing can exchange data between the electronic device and another electronic device.

The switch 304 is integrated into the outer surface of the housing and includes the toggle 306, which protrudes from the outer surface. The toggle 306 is mechanically movable between a first position that activates a first mode (e.g., a private mode) and a second position that deactivates that mode and/or activates a different mode. For example, a data line can be enabled to allow exchanging data with the electronic device only while the toggle 306 is in the first position, while the power line is enabled to allow transferring power to the electronic device regardless of whether the toggle is in the first position or the second position. In one example, the switch 304 is configured to interrupt the data line when the toggle 306 is moved from the second position to the first position, and the switch 304 is configured to restore the data line when the toggle 306 is moved from the first position to the second position.

As shown, the switch 304 is a slider or toggle type, enabling a user to readily see the active mode of a cable. A toggle switch is a suitable type of electronic switch because it provides a binary on-off control to physically interrupt a data/power line or allow it to resume. In one example, the switch can remove a metal contact from a data/power line or bring the two back into contact. When the contact is connected, the circuit is closed and data/power can flow between attached electronic devices. Then when the contact is moved away again, the data/power flow is interrupted and the circuit becomes open, and the electronic devices cannot transfer data/power. The toggle of a switch is manually operated, to move from one position to another. In each position, the toggle can latch into place and remain there until moved back. The toggle will normally remain in position until manually moved once more, although momentary switches also include an attached spring which will pull the actuator back to its starting point once the toggle is released or the plug is released from a socket.

When integrated in the connector 302, the switch 304 can be oriented to prevent inadvertently switching between the first mode and the second mode when the connector is plugged into or unplugged from the port of the electronic device. In the illustrated example, the switch 304 is oriented orthogonal to an axis in which the connector is configured to plug into the port of the electronic device. Further, the toggle 306 is movable orthogonal to the axis between the first position and the second position. In another example, a switch can be oriented so that plugging in the connector to a receptacle will cause activation of a private mode. For example, a switch can be oriented parallel to an axis in which the connector is configured to plug into the receptacle of the electronic device where the toggle is movable in parallel to the axis between a position that activates a private mode and a position that activates a non-private mode. When plugging into the receptacle, the position of the switch that activates the private mode is closer to the receptacle compared to the position that deactivates the private mode. As such, the force used to push the connector into the receptacle can also cause moving the switch into the position for activating the private mode.

A USB cable can include human perceptible indications that the cable is in one of multiple modes. In one example, an indication that the USB cable is in a private mode is made visible only when the toggle of the switch is in a position that activates the private mode and not visible when the toggle is in another position that activates a non-private mode. A different indication is visible only when the toggle is in the other position that activates the non-private mode and not visible otherwise. The indication can include a combination of color, iconography, text, etc. For example, a Light Emitting Diode (LED) next to the switch can emit different colors and/or patterns of lights depending on whether the USB cable is in a private mode or a non-private mode.

In the illustrated example, the indications include different text that are printed on the switch and which are alternatively revealed depending on whether the switch is in a first position or a second position. As such, the switch 304 is marked to enable the user to readily identify an active mode of operation. Specifically, when the toggle 306 is mechanically positioned to allow data transfers, a "Data On" message that is printed on the switch 304 is revealed while a "Data Off" message is hidden. On the other hand, when the toggle 306 is mechanically positioned to disable data transfers, the "Data Off" message that is printed on the switch 304 is mechanically revealed while the "Data On" message is hidden.

Figure 4:
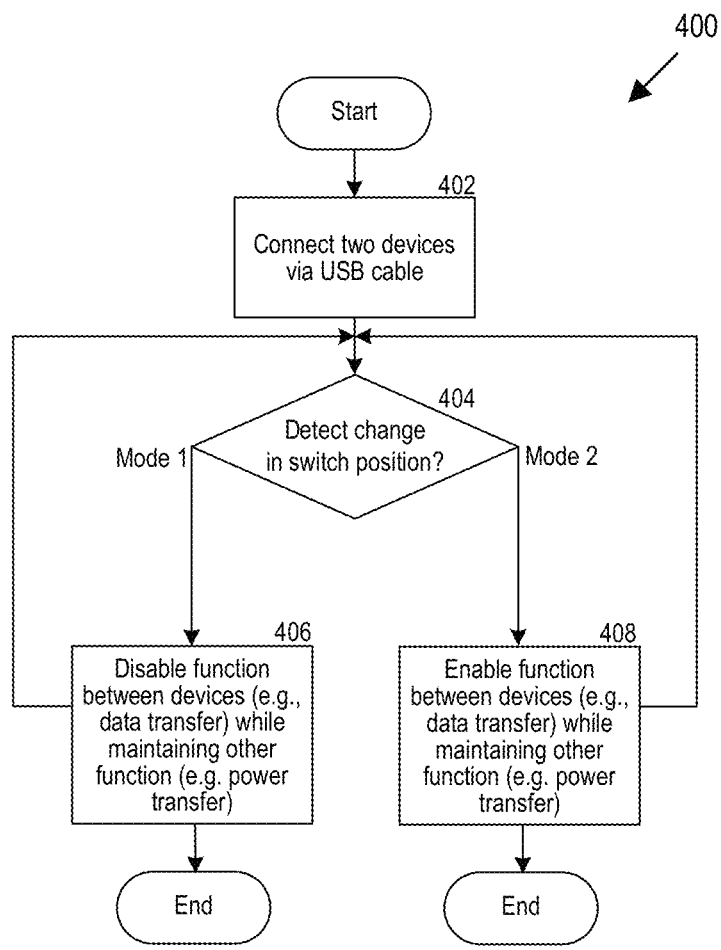
FIG. 4 is a flowchart that illustrates a method for switching a USB cable between one mode that disables one function while another function remains enabled.

FIG. 4 is a flowchart that illustrates a method for switching a USB cable between one of two modes that disables one function while another function remains enabled. The method is performed at the USB cable and caused by a switch being changed between at least two positions. As described earlier, the switch can include a toggle and is integrated in a connector of the USB cable or elsewhere on the USB cable, such as another structure elsewhere at the USB cable.

At 402, connectors at the ends of the USB cable are plugged into the receptacles of two electronic devices. For example, a connector of a Type-C USB cable can be plugged into the receptacle of a laptop and the other connector can be plugged into a receptacle of a mobile phone. Doing so causes self-configuration of data communications over the USB cable between the two electronic devices. For example, data communication over the USB cable is enabled for the mobile phone to upload data to the laptop computer and/or download data from the laptop computer. In addition, the USB cable enables the laptop to transfer power to charge the battery of the mobile phone. As such, the USB cable provides both functions to exchange data and transfer power.

At 404, a change in a position of the switch is actuated. When integrated in the connector, the switch can be oriented orthogonal (e.g., perpendicular) to an axis in which the connector plugs into the receptacle of a first electronic device, to mitigate the risk that a user accidently switches the USB cable to an undesired mode when plugging or unplugging from the connector. Instead, switching the USB cable between modes requires movement of the toggle in the orthogonal direction between two positions for different modes. In another example, the switch is oriented along the same axis in which the connector plugs into a receptacle of the electronic device. As such, the toggle is movable along the same axis to switch the USB cable between different modes. In this example, moving the toggle to a location closer to the receptacle as the connector is being plugged into the receptacle of the electronic device can cause the USB cable to activate a private mode by default.

At 406, in response to the switch being in a first position, a first mode is activated, which disables a first function of the USB cable while a second function remains enabled. In one example, the first mode is a private mode, the first function is a data communication function, and the second function is a power transfer function. As such, a user can disable the data communication function while the power transfer function remains enabled. In another example, the first mode is a power mode, the first function is a power transfer function, and the second function is a data communication function. As such, a user can enable the power transfer function while the data communication function remains enabled. In addition, the USB cable can be caused to display a first indication that the first mode is activated.

At 408, in response to the switch being in the second position, a second mode is activated, which enables the first function of the USB cable while the second function remains enabled. In one example, the second mode is a non-private mode where the user enables the data communication function while the power transfer function remains enabled. In another example, the second mode is a non-power mode where the user can disable the power transfer function while the data communication function remains enabled. In addition, the USB cable can be caused to display a second indication, different from the first indication, that the second mode is activated.

FIGS. 5A through 5D are illustrations 500 of a multiport hub 502 coupled to a primary port 504 (e.g., USB cable). The multiport hub 502 integrates switches 506-1 and 506-2 (also referred to herein collectively as "switches 506" and individually as "switch 506") and different types of ports 508-1 through 508-5 (also collectively referred to as "ports 508" and individually as "port 508"). The switches 506 can be switched between at least two alternative positions to set the multiport hub 502 or individual ports 508 in different modes that activate or deactivate selected functions.

Figure 5A:
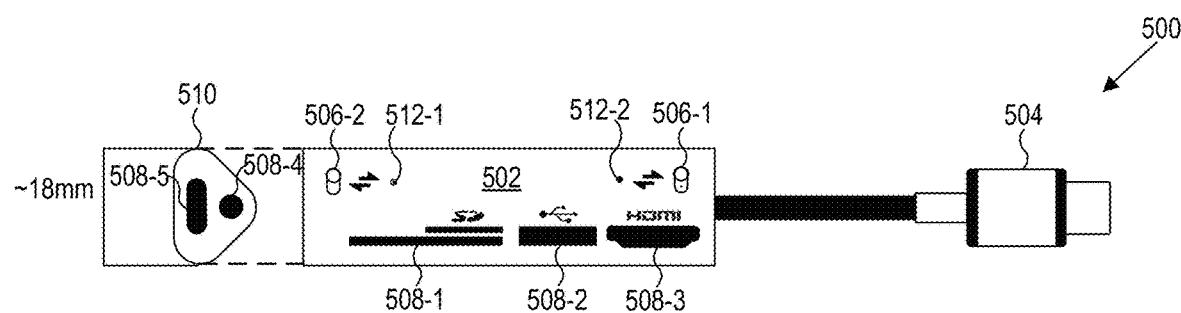
FIG. 5A illustrates a top view of a multiport hub with integrated privacy switches for changing functional modes that disable or enable data or power communications.

FIG. 5A illustrates a top view of the multiport hub 502 coupled to the USB cable 504. Examples include the USB cable 504 being integrated into the multiport hub 502 or the USB cable 504 being detachably connectable to the multiport hub 502. For example, the multiport hub 502 can include a USB-C port for connecting the USB cable 504. In another example, the USB cable 504 includes the end portion 300 with the switch 304, that can be switched between non-private and private mode as described with respect to FIG. 3. The switches 506 each include a toggle that can be positioned in one or two, three, or more positions for setting one of two, three, or more modes for one or more ports. In one example, a first position activates a non-private mode and deactivates a private mode, a second position activates a private mode and deactivates the non-private mode, a third position terminates all modes (e.g., an "off" mode). As such, each switch 506 can change functional modes that disable or enable data and/or power through the ports 508.

The switches 506 can control one or more functional modes of respective ports 508, the entire multiport hub 502, or combinations thereof. In the illustrated example, the multiport hub 502 has 1-to-N connections where, for example, the USB cable 504 is coupled to the ports 508 through the multiport hub 502. As shown, the ports 508 include a card or storage media port 508-1, a USB-A port 508-2, an HDMI port 508-3, an audio jack 508-4, and a USB-C port 508-5. The audio jack 508-4 and the USB-C port 508-5 are located at an end 510 of the multiport hub 502. Additional examples of ports (e.g., Ethernet, other display ports, Thunderbolt) are not illustrated for the sake of brevity but are within the scope of the embodiments. In the illustrated example, the data-only connections include the card or storage media port 508-1 and the audio jack 508-4. The data and power ports include the USB-A port 508-2, the HDMI port 508-3, and the USB-C port 508-5.

In one example, the switch 506-1 can disable or enable data and/or power transfers between the USB cable 504 and any of the ports 508. The multiport hub 502 can thus form 1-to-N connections between the USB cable 504 and the ports 508. The switch 506-2 can independently disable or enable data and/or power transfers between the USB cable 504 and the USB-C port 508-5. In one example, the multiport hub 502 can also include 1-to-N connections between the USB-C port 508-5 and the remaining ports 508-1 through 508-4 as well as the USB cable 504. As such, a port (e.g., USB-A port 508-3) can have different sources of data and power. For example, the switch 506-1 can enable data exchanges between the USB cable 504 and any of the ports 508-1 through 508-4 while the switch 506-2 can allow power transfer but not data transfers to the ports 508-1 through 508-4 and USB cable 504. Hence, the multiport hub 502 can have multiple 1-to-N connections among the USB cable and the ports 508.

The multiport hub 502 also includes human perceptible indications for multiple modes. In one example, an indication that the multiport hub 502 is in a private mode is made visible only when a toggle of the switch is in a position that activates the private mode and not visible when the toggle is in another position that activates the non-private mode. A different indication is visible only when the toggle is in the other position that activates the non-private mode and not visible otherwise. The indication can include a combination of color, iconography, text, etc. In one example, the multiport hub 502 includes LED lights 512-1 and 512-2 that can indicate the corresponding states for the functional modes controlled by switch 506-1 and 506-2, respectively. In one example, the LED light 512-2 is for the switch 506-2, which controls the USB-C port 508-5. The LED light 512-2 can emit different colors and/or patterns of lights depending on whether the USB-C port 508-5 is in a private mode or a non-private mode. In one example, a steady-state light indicates that power is being transferred and a blinking light indicates that data is being transferred.

In one example, the switch 506-1 controls functional modes collectively for all the ports 508 of the multiport hub 502. For example, the entire multiport hub 502 is set in a private mode when the toggle of the switch 506-1 is in a first position and the entire multiport hub 502 is set in a non-private mode when the toggle of the switch 506-1 is in a second position. When set in a non-private mode, the multiport hub 502 enables data transfers via an electronic device connected to the USB cable 504 and a device connected to any of the ports 508 while allowing power transfers. In contrast, when set in a private mode, the multiport hub 502 disables (e.g., blocks) data transfers via an electronic device connected to the USB cable 504 and an electronic device connected to any of the data and power ports 508 without affecting power transfers via the data and power ports. As such, the multiport hub 502 could be used to charge devices plugged into the data and power ports regardless of the position of the switch, while data transfers can be controlled with the switch. In another example, the switch 506-1 controls whether power transfers are enabled or disabled based on the position of the switch 506-1 while data transfers via the ports 508 remain uninterrupted regardless of the position of the switch 506-1. More broadly, the switch 506-1 can control whether one function is enabled or disabled based on the position of the switch 506-1 while another function remains uninterrupted regardless of the position of the switch 506-1.

In another example, the switch 506-2 controls functional modes for all the ports 508 of the multiport hub 502 different from the functional modes that are controlled by the switch 506-1. For example, the switch 506-1 can control data transfers and the switch 506-2 can control power transfers via the ports 508. In yet another example, the switches 506 can be dedicated switches for individual ports. For example, the switch 506-1 can be a privacy switch only for the HDMI port 508-3 and the switch 506-2 can be a privacy switch only for the USB-C port 508-5. Embodiments can include switches on the multiport hub 502 for each of the ports 508 or only for either the data and power type ports or the data-only ports. In another example, the multiport hub 502 includes a combination of switches that control multiple ports and control only some ports. As such, the multiport hub 502 provides a user with multiple combinations of control over the ports 508.

Figure 5B:
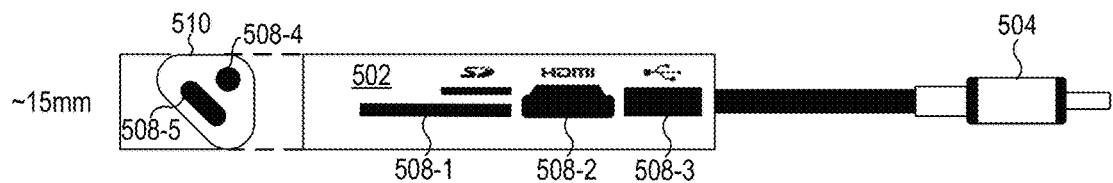
FIG. 5B illustrates a side view of the multiport hub of FIG. 5A including different types of ports that can be switched between private and non-private modes.
Figure 5C:
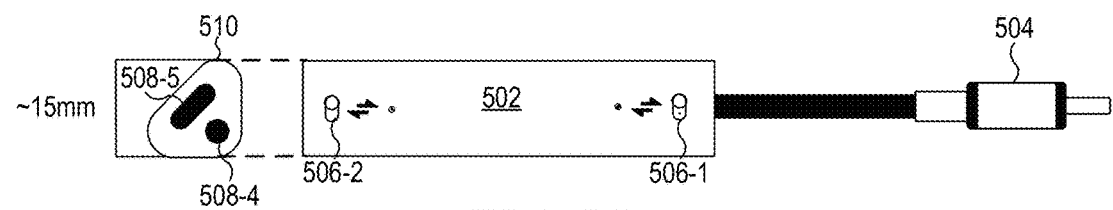
FIG. 5C illustrates a side view of the multiport hub of FIG. 5A including one or more integrated privacy switches.
Figure 5D:
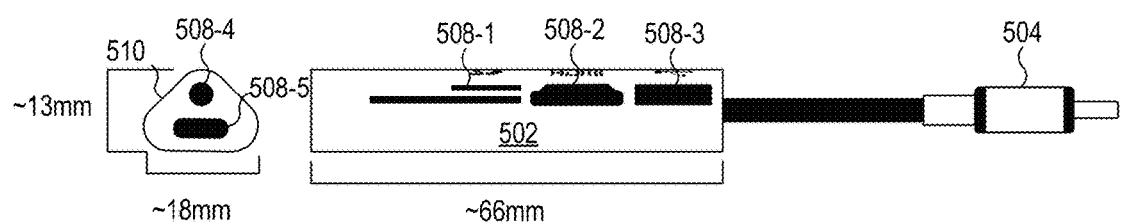
FIG. 5D illustrates a profile view of the multiport hub of FIG. 5A.

The multiport hub 502 has a triangular profile as shown with the end 510. That is, the multiport hub 502 has three sides having planer surfaces. A first planer surface includes at least a portion of the N ports and a second planer surface includes the first switch. An angle between the first planer surface and the second planer surface is less than 90 degrees (e.g., forms a triangle with a third planer surface). FIG. 5B illustrates one side view of the multiport hub 502 including the different types of ports 508 and FIG. 5C illustrates another side of the multiport hub 502 including the switches 506. Lastly, FIG. 5D shows a profile view of the multiport hub 502.

Figure 6:
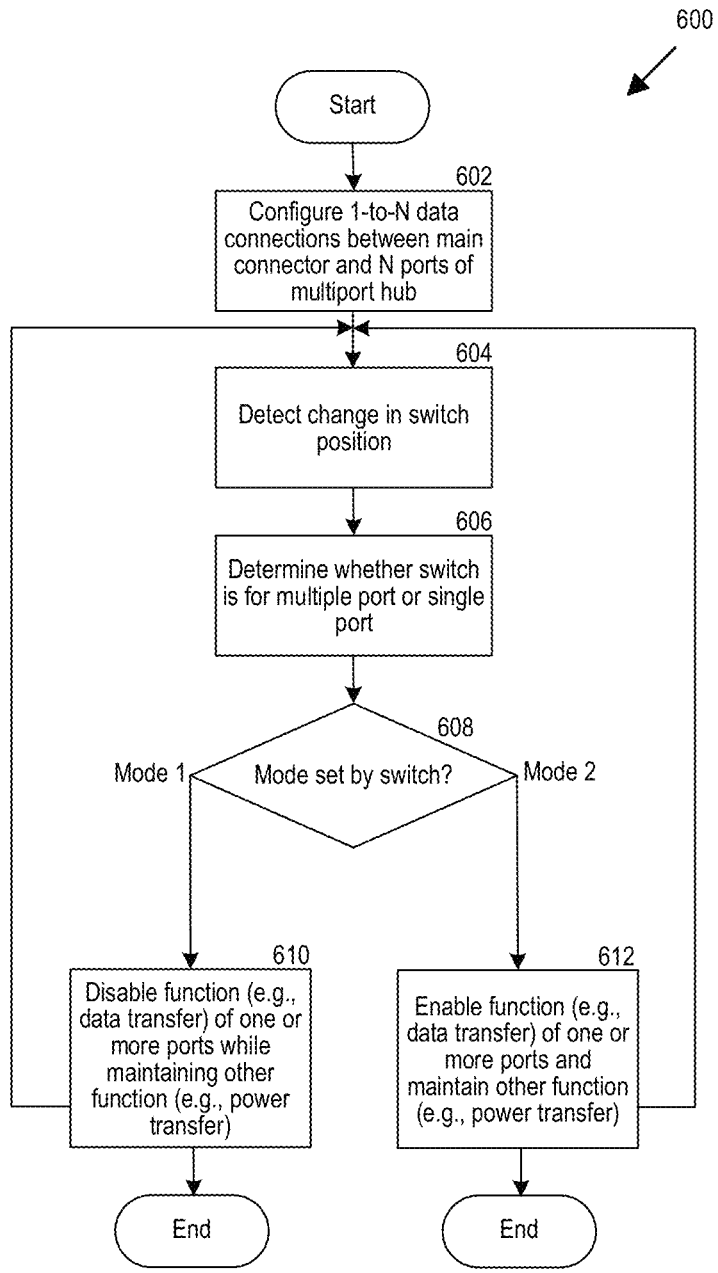
FIG. 6 is a flowchart that illustrates a method 600 for switching one or more ports of a multiport hub between modes that enable or disable certain functions.

FIG. 6 is a flowchart that illustrates a method 600 for switching one or more ports of the multiport hub between modes that enable and/or disable certain functions. In one example, a port of a multiport hub is switched between one of two modes that disables one function (e.g., data communications) while another function remains enabled (e.g., power transfer). Examples of the ports include data-only type (e.g., Ethernet, a 3.5 mm jack, a card or storage media) and data and power type (e.g., USB, Thunderbolt, display port).

At 602, the multiport hub is configured for 1-to-N connections between a primary connector and a number (N) of ports. In one example, the primary port is configured to removably receive the USB cable into a USB port of the multiport hub. In another example, the USB cable is integrated into the multiport hub (e.g., no detachable). The primary connector is configured to couple the multiport hub to an external source of data and power (e.g., electronic device). The primary connector can include a USB cable having a plug for an electronic device. A housing of the multiport hub includes the N ports integrated therein to form the 1-to-N connections between the USB cable and the N ports. In one example, some of the N connections each have a data line but not a power line and some each include both a data line and a power line.

At 604, the multiport hub detects a change in a switch that is integrated on an outer surface of the housing of the multiport hub. In one example, the switch includes a mechanical component (e.g., toggle) that is movable to a position that sets a first mode (e.g., private mode) for a particular port and movable to another position that sets a second mode (e.g., non-private mode) for the particular port. The multiport hub is configured to interrupt a data line of the particular port while in private mode and restore the data line when switching to non-private mode. In one example, the mechanical component is also movable to a third position that sets the first port in an "off" mode.

At 606, the multiport hub determines whether the switch is associated with multiple ports or a single port. In one example, the multiport hub includes multiple switches that are configured to mechanically change the modes of ports (e.g., less than all ports) between a first mode and a second mode. In the example, some data lines are enabled to communicate data while in the first mode and disabled to communicate data while in the second mode. Further, power lines of ports are enabled to transfer power regardless of whether the ports are in the first mode or the second mode. In one example, a primary switch is configured to disable all data lines of N connections when the private mode is activated and all power lines remain enabled regardless of whether the switch is positioned to set the private mode or the non-private mode. In another example, a first switch controls only a first port and a second switch controls only a second port, where the second switch is independent of the first switch to set the second port in the private mode independent of the first port.

At 608, the multiport hub determines whether the switch is in a first position to set a first mode or a second position to set a second mode. In one example, the first mode is a private mode, the second mode is a non-private mode, the first function includes a data communication function, and the second function includes a power transfer function. In another example, the first mode is a power mode, the second mode is a non-power mode, the first function includes power transfer from a first electronic device to a second electronic device, and the second function includes data communication.

At 610, in response to the switch being in a first position, the multiport hub activates a first mode that disables a first function while a second function remains enabled. The multiport hub can cause display of a first indication in response to the switch being changed to activate the first mode. In one example, a first visual indicator is configured to indicate that a first port is set in the private mode. The first visual indicator can include an element printed on the first switch or a light element configured to emit different colors or patterns of lights depending on whether the first port is in the private mode. In one example, a first data line and the second data line are disabled when the first switch sets the private mode.

At 612, in response to the switch being changed to a second position, the multiport hub activates a second mode that enables the first function while the second function remains enabled. The multiport hub can cause display of a second visual indication, different from the first visual indication, in response to the switch being changed to activate the second mode. Thus, in one example, a first data line of the first port is disabled when a first switch is in the first position, and a first power line of the first port is enabled regardless of whether the first switch is in the first position or the second position.

FIGS. 7A, 7B, and 8A-D illustrate embodiments of the disclosed technology. These embodiments all relate to a connection hub device. The connection hub device is constructed such that a housing contains two or more connection interfaces (e.g., a USB port and an integrated power cable) for a user to interact with. These connection interfaces are coupled together with at least one placed on the end portion of the housing and at least one placed on the remaining body portion, in one example. Further, at least one of the connection interfaces on the connection hub device is configured to switch between multiple modes. The connection hub device user controls the switching process through a mechanical component of the device. In these embodiments, a user moves the mechanical component between a first position and a second position, relative to the body portion of the housing, to trigger the switch between modes. The modes represent functions that the connection hub device allows. For example, in the first position, the connection hub device may allow a power function and disable a data communication function. When a user moves the mechanical component to the second position, the connection hub device may allow both the power and the data communication functions.

Figure 7A:
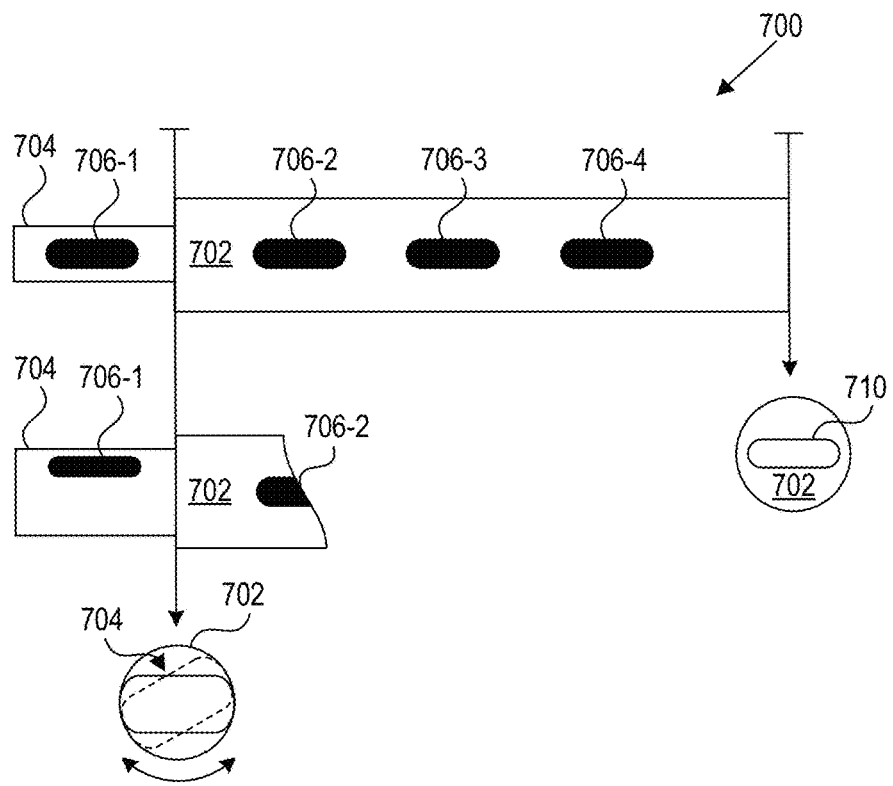
FIG. 7A illustrates side views of a device including a rotatable element that is operable as a privacy switch for the port.
Figure 7B:
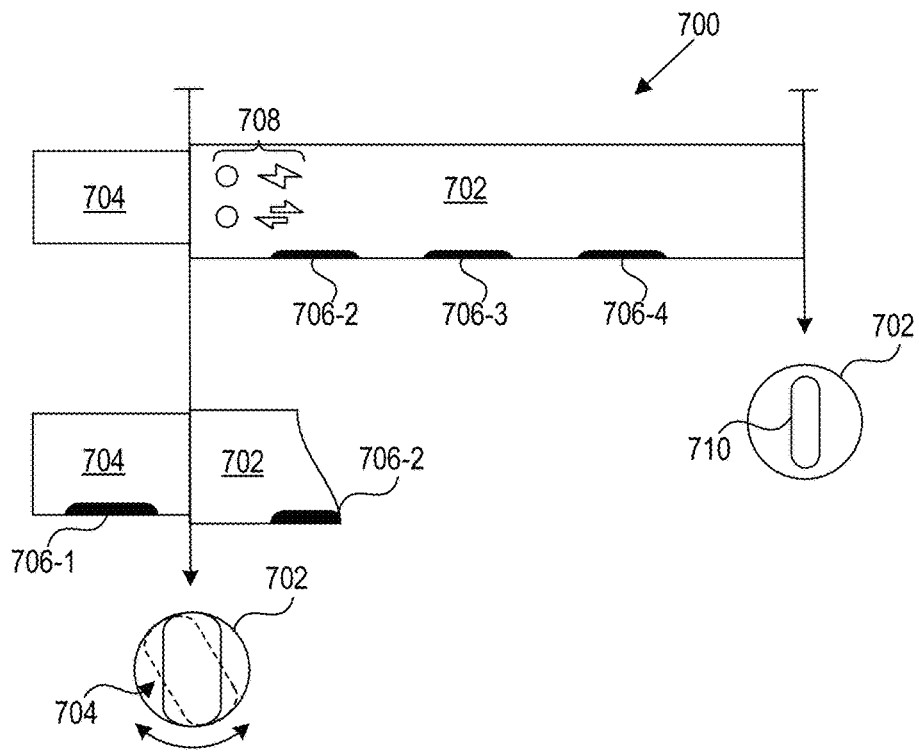
FIG. 7B illustrates top views of the device of FIG. 7A including the rotatable element that is operable as a privacy switch.

Specifically, FIG. 7A illustrates side views of a connection hub device 700 including a mechanical component 704 that is operable as a privacy switch and a connection interface 710 on the body portion 702. FIG. 7B illustrates top views of the same device 700 of FIG. 7A including the mechanical component 704 that is operable as a privacy switch and the connection interface 710 on the body portion 702. The mechanical component 704 comprises the end portion of the connection hub housing 700 and can rotate between a first position and a second position, relative to the body portion 702, to switch a connection interface between one or more modes depending on the degree of rotation. For example, the mechanical component 704 can switch a connection interface between one of two modes that disables one function (e.g., data communications) while another function remains enabled (e.g., power transfer). That is, a first rotation that meets or exceeds a first fixed point or meets or exceeds a first number of degrees can set a connection interface on the device 700 to a private mode. A second rotation that meets or exceeds a second fixed point or meets or exceeds a second number of degrees can set a connection interface on the connection hub device 700 to a non-private mode. In one example, the difference between the first fixed point and the second fixed point is 45 or 90 degrees. In another example, the first number of degrees can be equal to or different from the second number of degrees (e.g., each 45-degree rotation switches modes). Examples of the connection interface include data and power type (e.g., USB, Thunderbolt, display). The body 702 of the device 700 can include a data and power type ports and/or data-only type ports (e.g., Ethernet, a 3.5 mm jack, a card or storage media).

As shown in FIGS. 7A and 7B, the connection interface 704 is a connector (e.g., USB connector) that includes a marking 706-1. The body portion 702 includes another connection interface 710 (e.g., a USB connector) and markings 706-2, 706-3, and 706-4 (collectively referred to herein as "body markings 706"). The connection interface 704 also acts as the mechanical component as the user can rotate the connector between a first position and a second position to achieve the desired functionality. When the marking 706-1 on the connector is positioned in line with the body markings 706, the connection hub device 700 is in a first mode that enables both functions (e.g., power and data to flow). This first mode can be communicated to the user using light emitting indicators 708 on the device 700. In this embodiment, the light emitting indicators are positioned on the body portion 702 and use a light to notify the user that both power and data are ready to flow. When the marking 706-1 on the connector 704 is rotated in any direction out of line with the body markings 706, one function is disabled. In this example, when the marking 706-1 on the connector 704 and the body markings 706 on the body portion 702 are not aligned, power is still allowed to flow but data communication is disabled.

In another example, the device 700 is a multiport connection hub and the body portion 702 includes another connection interface 710 (e.g., a USB connector) and additional connection interfaces 706-2, 706-3, and 706-4 (e.g., instead of body markings 706). When the end portion marking 706-1 is positioned in line with the connection interfaces on the body portion 706-2, 706-3, and 706-4, the device 700 enables both functions (e.g., power and data to flow). This mode can be communicated to the user using light emitting indicators 708 on the device 700. When the user rotates the mechanical component 704 in any direction, such that the end portion marking 706-1 is out of line with the other ports on the body, one function is disabled while the other function remains enabled. For example, when the end portion marking 706-1 is not aligned with the connection interfaces on the body 706-2, 706-3, and 706-4, power is still enabled to flow but data communication is disabled.

Figure 8A:
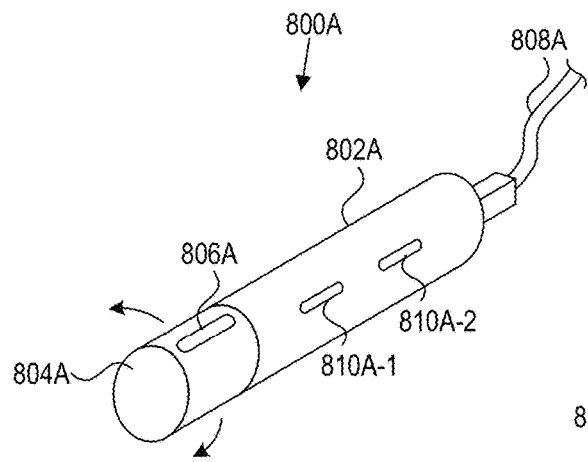
FIG. 8A illustrates a device including a rotatable port that is operable as a privacy switch.

FIG. 8A illustrates a connection hub device 800A including a rotatable end portion 804A (e.g., mechanical component) that is operable as a privacy switch, and another connection interface 808A (e.g., power cable) on the body portion 802A. The rotating end portion 804A contains a connection interface 806A (e.g., USB port). The connection interfaces 806A and 808A may be the only connection interfaces on the device 800A accompanied by markings placed on the body 810A-1 and 810A-2. In this illustration, the connection hub device 800A includes a body portion 802A with ports 810A-1 and 810A-2. In one example, the rotation of the end portion 804A between a first position and a second position allows a user to switch between one of two modes that disables one function (e.g., data communications) while another function remains enabled (e.g., power transfer). For example, the connection hub device 800A is configured to disable/enable both functions only for the connection interface 806A when the rotating end 804A is positioned such that the connection interface 806A is in line with any other connection interfaces or markings placed on the body 802A.

Figure 8B:
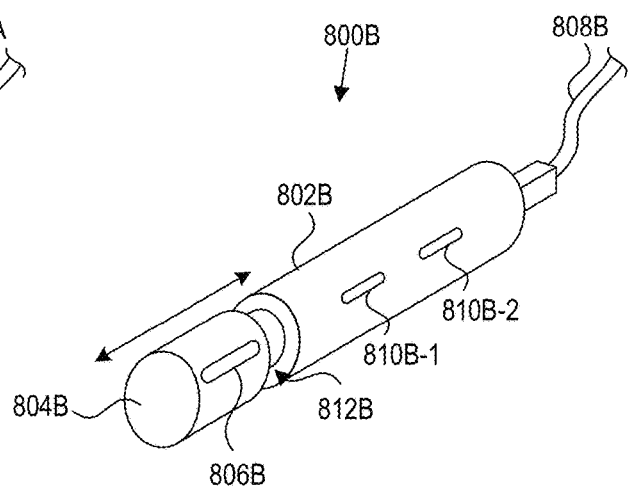
FIG. 8B illustrates a device including a push/pull port that is operable as a privacy switch.

FIG. 8B illustrates a connection hub device 800B including a body portion 802B, an end portion 804B, and a mechanical component 812B that can extend the end portion 804B, relative to the body portion 802B along the length of the housing. The end portion 804B may contain a connection interface 806B (e.g., USB port). In one example, the connection interfaces 806B and 808B are the only connection interfaces on the device. In another example, the device 800B includes connection interfaces 810B-1 and 810B-2 as well as the connection interfaces 806B and 808B. The ability to pull the end portion 804B to a first position away from the body, and to push it back into a second position flush with the body 802B, allows a user to switch the connection interface 806B between one of two modes that disables one function (e.g., data communications) while another function remains enabled (e.g., power transfer). For example, the device 800B can be configured to disable a data communication function for connection interface 806B when the end portion 804B is pulled away from the body portion 802B while maintaining a power flow function.

Figure 8C:
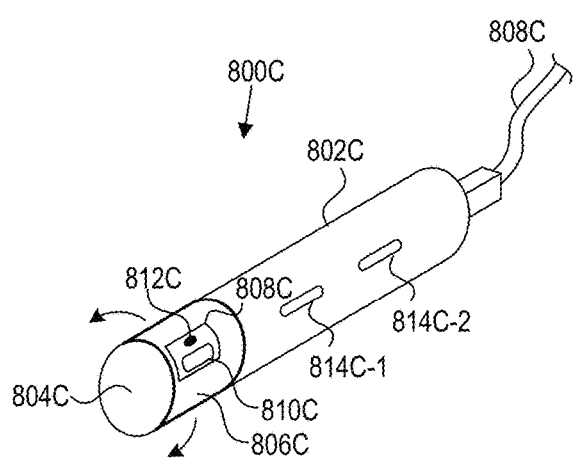
FIG. 8C illustrates a device including a rotatable cover that is operable as a privacy switch.

FIG. 8C illustrates a connection hub device 800C including a body portion 802C coupled to an end portion 804C with a rotating cover 806C. The rotating cover 806C can cover a connection interface 810C (e.g., USB port). In one embodiment, the rotating cover 806C contains one hole the size of the connection interface 810C. The connection interface 810C may be the only connection interface on the device 800C along with a connection interface 808C (e.g., power cable). In another example, more connection interfaces 814C-1 and 814C-2 may be disposed on the body 802C along with the connection interfaces 810C and 808C. The ability to rotate the cover 806C between a first position and a second position allows a user to protect the connection interface 810C, disabling its use. Further, the device 800C may be configured to, by turning the rotating cover 806C, switch between one of two modes for the connection interfaces placed on the remainder of the body 802C that disables one function (e.g., data communications) while another function remains enabled (e.g., power transfer). For example, the connection hub device 800C can be configured such that when the rotating cover 806C covers the connection interface 810C, a function like data communication is disabled for connection interfaces 814C-1 and 814C-2 on the body 802C. The embodiment shown in FIG. 8C also includes a light emitting indicator 812C that communicates the mode of device 800C to the user.

Figure 8D:
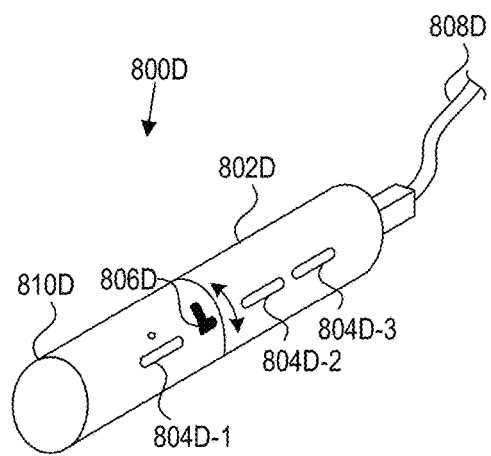
FIG. 8D illustrates a device including a port associated with a toggle that operates a privacy switch.

FIG. 8D illustrates a connection hub device 800D including an end portion 810D with a connection interface 804D-1 (e.g., USB port) coupled to a switch 806D (the mechanical component). Device 800D also includes a connection interface 808D (e.g., power cable) on the body portion 802D. In one example, the connection interface 804D-1 and 808D and the switch 806D are the only connection interfaces and switch, respectively, on the device 800D. In another example, the connection interfaces 804D-1 and 808D and the switch 806D are just one of many connection interfaces and switches disposed on the device 800D. The ability to toggle the switch 806D between a first position and a second position allows a user to switch between one of two modes that disables one function (e.g., data communications) while another function remains enabled (e.g., power transfer). For example, the connection hub device 800D may be configured to disable a data communication function for the connection interface 804D-1 when the switch 806D is disposed in a position in line with connection interfaces 804D-2 and 804D-3 of the body portion 802D.

Computer System

Figure 9:
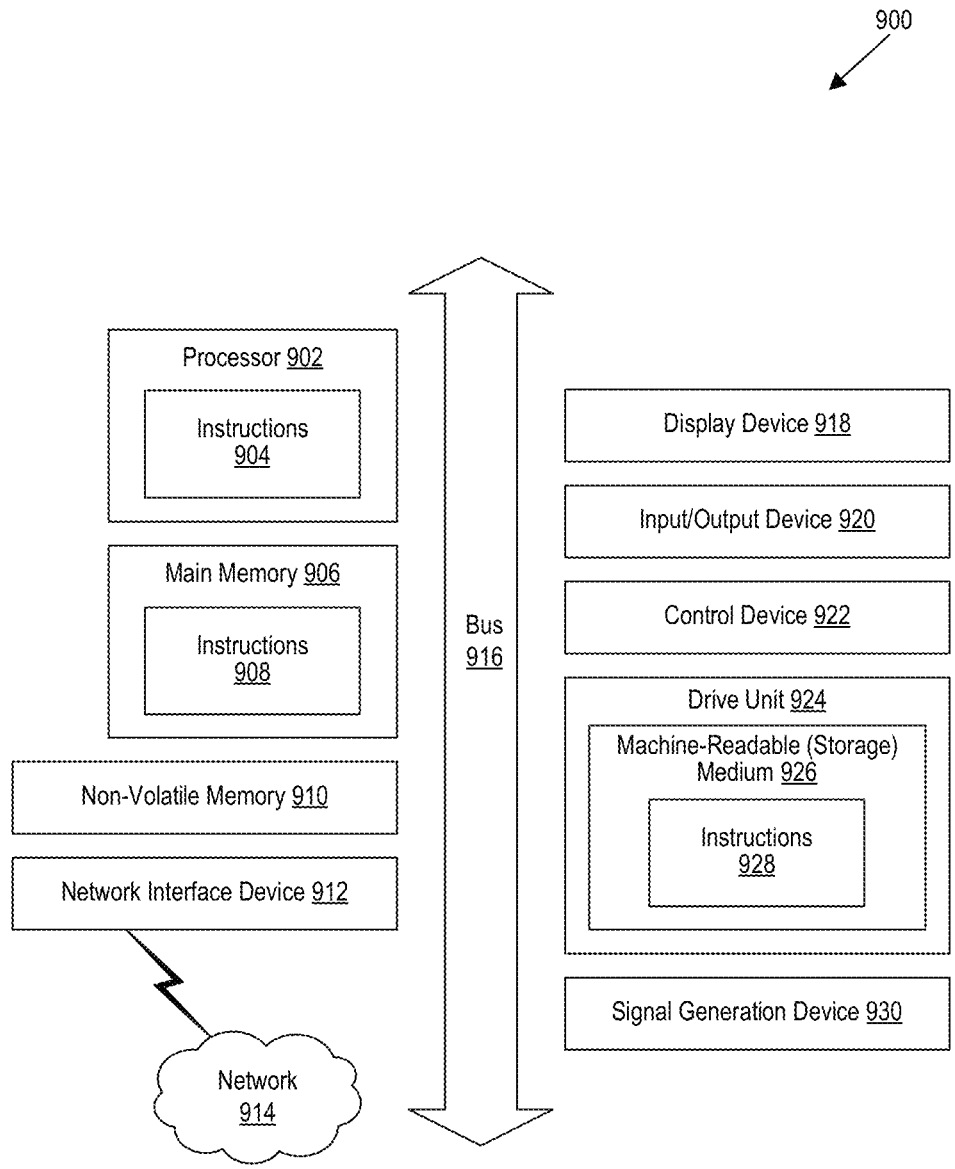
FIG. 9 is a block diagram that illustrates an example of a computer system in which at least some operations described herein can be implemented.

FIG. 9 is a block diagram that illustrates an example of a computer system 900 in which at least some operations described herein can be implemented. As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in a network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 910, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computing system 900 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A multiport hub comprising:
a housing coupled to a universal serial bus (USB) cable having a plug for an electronic device, the housing including:
   a number (N) of ports integrated in the housing,
   wherein the multiport hub includes 1-to-N connections between the USB cable and the N ports, each of the N connections including at least one of a data line configured to communicate data or a power line configured to transfer power; and
   a first switch integrated on an outer surface of the housing, the switch including:
      a mechanical component that is movable to a first position that sets a first port of the N ports in a private mode, movable to a second position that sets the first port in a non-private mode, and movable to a third position that sets the first port in an off position,
      wherein a first data line of the first port is disabled when the first switch is in the first position,
      wherein a first power line of the first port is enabled regardless of whether the first switch is in the first position or the second position, and
      wherein the first data line and the first power line are both disabled when the first switch is in the third position.

2. The multiport hub of claim 1 further comprising:
a first connection of the N connections including the first data line of the first port and precluding a first power line; and
a second connection of the N connections including both a second data line and a second power line of a second port of the N ports,
   wherein the first data line and the second data line are disabled when the first port and the second port are in the private mode, and
   wherein the second power line is enabled regardless of whether the first port is in the private mode or in the non-private mode.

3. The multiport hub of claim 1 comprising:
wherein the first switch is configured to interrupt the first data line when the mechanical component is changed from the second position to the first position, and
wherein the first switch is configured to restore the first data line when the mechanical component is changed from the first position to the second position.

4. The multiport hub of claim 1 comprising:
a main port configured to removably receive the USB cable,
   wherein the N connections includes a respective data line between the main port and each of the N ports.

5. The multiport hub of claim 1:
wherein the USB cable is integrated into the multiport hub, and
wherein the N connections include a respective data line between the USB cable and each of the N ports.

6. The multiport hub of claim 1 further comprising:
a number (M) of the N connections that each include a data line and preclude a power line, and
a number (P) of the N connections that each include both a data line and a power line, where N=M+P.

7. The multiport hub of claim 1, wherein the N ports include a combination of:
an Ethernet port,
a 3.5 mm jack port,
a card or storage media port,
a USB port,
a Thunderbolt port, or
a display port.

8. The multiport hub of claim 1:
wherein the first switch is configured to disable all data lines of the N connections when the private mode is activated, and
wherein all power lines of the N connections are enabled regardless of whether the private mode is activated or the non-private mode is activated.

9. The multiport hub of claim 1, wherein the first switch controls only the first port, the multiport hub further comprising:
a second switch that controls only a second port of the N ports,
   wherein the second switch is independent of the first switch to set the second port in the private mode independent of the first port.

10. The multiport hub of claim 1 further comprising:
a first visual indicator configured to indicate that the first port is set in the private mode,
   wherein the first visual indicator includes an element printed on the first switch or a light element configured to emit different colors or patterns of lights depending on whether the first port is set in the private mode.

11. The multiport hub of claim 1 further comprising:
a first planer surface including at least a portion of the N ports; and
a second planer surface including the first switch,
   wherein an angle between the first planer surface and the second planer surface is less than 90 degrees.

12. The multiport hub of claim 1, wherein one port of the N ports is operable for transferring power but not data to any remaining N connections.

13. A multiport hub comprising:
a primary connector configured to communicatively couple the multiport hub to an external source of data and power;
a number (N) of data lines configured to communicate data between the primary connector and N ports integrated in the multiport hub;
a number (M) of power lines configured to transfer power between the primary connector and M ports,
   wherein M ports≤N ports, and
   wherein the multiport hub forms 1-to-N connections between the primary connector and the N ports;
one or more switches configured to mechanically change a number (P) of ports between a first mode, a second mode, and a third mode when changed to a first position, a second position, or a third position, respectively,
   wherein P data lines are enabled to communicate data while in the first mode and disabled to communicate data while in the second mode,
   wherein the M power lines are enabled to transfer power from the external source of data and power regardless of whether the one or more switches are operated to mechanically change the P ports between the first mode and the second mode, and
   wherein the P data lines and M power lines are disabled while in the third mode.

14. The multiport hub of claim 13 further comprising:
multiple switches configured to independently enable the P data lines while in the first mode and disable the P data lines while in the second mode.

15. The multiport hub of claim 13 further comprising:
a primary switch configured to enable all the P data lines while in the first mode and disable all the P data lines while in the second mode.

16. A method for switching a particular port of a multiport hub between one of multiple modes, the method comprising:
configuring 1-to-N data communications between a main connector and a number (N) of ports of the multiport hub;
detecting a change in a position of a switch integrated in the multiport hub;
in response to the switch being changed to a first position, activating a first mode that disables a first function of the particular port while a second function of the particular port remains enabled;
in response to the switch being changed to a second position, activating a second mode that enables the first function of the particular port while the second function of the particular port remains enabled, and
in response to the switch being changed to a third position, deactivating the first mode and the second mode.

17. The method of claim 16, wherein the first mode is a private mode, the second mode is a non-private mode, the first function is a data communication function, and the second function is a power transfer function.

18. The method of claim 16, wherein the first mode is a power mode, the second mode is a non-power mode, the first function includes power transfer from a first electronic device to a second electronic device, and the second function includes data communication.

19. The method of claim 16:
wherein the switch includes a toggle that is integrated in the multiport hub and is associated with the particular port of the N ports, and
wherein the toggle is movable between the first position that activates the first mode and the second position that activates the second mode for the particular port.

20. The method of claim 16 further comprising:
causing display of a first indication in response to the switch being changed to activate the first mode; and
causing display of a second visual indication, different from the first visual indication, in response to the switch being changed to activate the second mode.

21. A connection hub comprising:
a number (N) of connection interfaces forming 1-to-N connections between a first connection interface and each of the N connection interfaces,
wherein a particular connection interface of the N connection interfaces is capable of being switched between multiple modes;
a housing including:
a body portion including the first connection interface; and
an end portion coupled to the body portion, the end portion including:
a second connection interface coupled to the first connection interface; and
a mechanical component configured to move relative to the body portion,
wherein moving the mechanical component to a first position switches the particular connection interface to a first mode that disables a first function,
wherein moving the mechanical component to the second position switches the particular connection interface to a second mode that enables the first function, and
wherein a second function of the particular connection interface remains enabled regardless of any mode of the connection interface.

22. The connection hub of claim 21:
wherein the second connection interface corresponds to a USB connector, and
wherein the mechanical component is configured to rotate the USB connector between the first position and the second position.

23. The connection hub of claim 21 further comprising:
a light emitter configured to indicate a current mode of the particular connection interface,
wherein the light emitter is configured to indicate a current mode of the particular connection interface.

24. The connection hub of claim 21:
wherein the second connection interface corresponds to a port, and
wherein the mechanical component is configured to rotate the end portion between the first position and the second position relative to the body portion.

25. The connection hub of claim 21:
wherein the mechanical component corresponds to the end portion,
wherein the second connection interface corresponds to a port, and
wherein the end portion is configured to move along a length of the housing relative to the body portion between the first position and the second position.

26. The connection hub of claim 21:
wherein the mechanical component corresponds to a cover of the second connection interface,
wherein the cover is configured to rotate between the first position and the second position by rotating perpendicularly relative to the housing; and
wherein the cover contains a cutout having a size of at least the second connection interface.

27. The connection hub of claim 21:
wherein the second connection interface corresponds to a port, and
wherein the mechanical component corresponds to a switch that is configured to move between the first position and the second position.

28. The connection hub of claim 21:
wherein the multiple modes include a configuration to communicate data in a first mode and a configuration to transfer power, and
wherein the particular connection interface is configured to transfer power regardless of whether the particular connection interface is in the first mode or the second mode.

29. The connection hub of claim 21:
wherein the first position aligns the second connection interface with the remaining connection interfaces on the body portion, and
wherein the second position is configured to any position other than the first position.

* * * * *